United States Patent [19]

Richardson et al.

[11] Patent Number: 5,680,790
[45] Date of Patent: Oct. 28, 1997

[54] RIVETING ANVIL

[76] Inventors: Thomas W. Richardson; Mary Jane Richardson, both of 934 Cleveland Rd., Hinsdale, Ill. 60521

[21] Appl. No.: 703,343

[22] Filed: Aug. 26, 1996

[51] Int. Cl.⁶ .................................................. B21D 37/01
[52] U.S. Cl. .................... 72/462; 29/524.1; 29/243.53
[58] Field of Search ................................ 72/462, 391.4; 29/524.1, 525.2, 243.517, 243.53, 243.54, 283, 283.5

[56] References Cited

U.S. PATENT DOCUMENTS

| | | | |
|---|---|---|---|
| 3,432,925 | 3/1969 | Woolley | 29/243.54 |
| 3,913,180 | 10/1975 | Pray . | |
| 4,202,243 | 5/1980 | Leonhardt | 29/524.1 |
| 4,380,109 | 4/1983 | Pray | 29/243.53 |
| 5,361,473 | 11/1994 | Landes | 29/243.517 |
| 5,390,407 | 2/1995 | Musil | 29/524.1 |
| 5,487,217 | 1/1996 | Richardson et al. . | |

FOREIGN PATENT DOCUMENTS

| | | | |
|---|---|---|---|
| 0086641 | 7/1981 | Japan | 29/243.54 |
| 2231523 | 11/1990 | United Kingdom | 29/525.2 |

OTHER PUBLICATIONS

RIV-NAIL Brochure advertisement.

*Primary Examiner*—Lowell A. Larson
*Assistant Examiner*—Ed Tolan
*Attorney, Agent, or Firm*—Gerstman, Ellis & McMillin, Ltd.

[57] ABSTRACT

An anvil for use in riveting one element to another element such as belting and a clasp for the belting. The anvil defines at least one aperture, and preferably a plurality thereof, for receiving detachable, rivet-carrying nails, whereby a rivet carried on the nail has an end that faces the anvil. The anvil defines an outer face surrounding the aperture for engaging and shaping the rivet end. The outer face is free of adjacent, upstanding walls beyond the normal diameter of the rivet and outside of and facing the aperture. Accordingly, the rivet end may spread freely outwardly from the aperture as the anvil shapes the rivet end, contrary to the prior art.

18 Claims, 1 Drawing Sheet

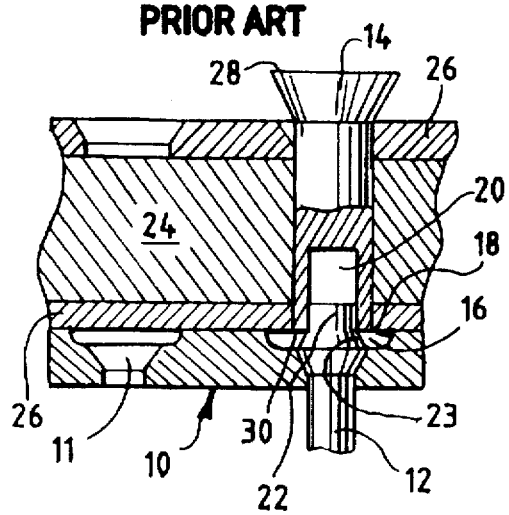
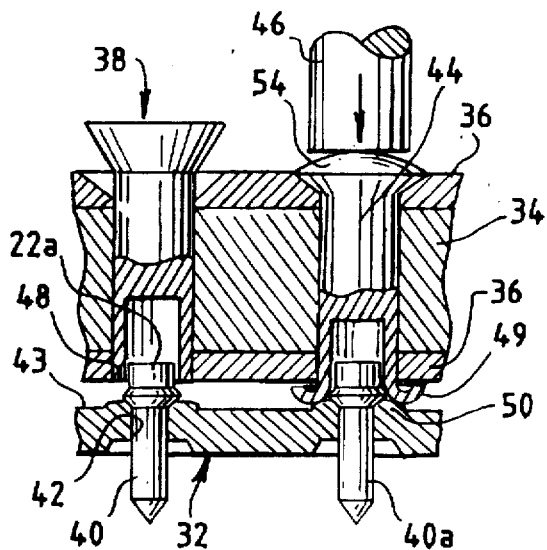
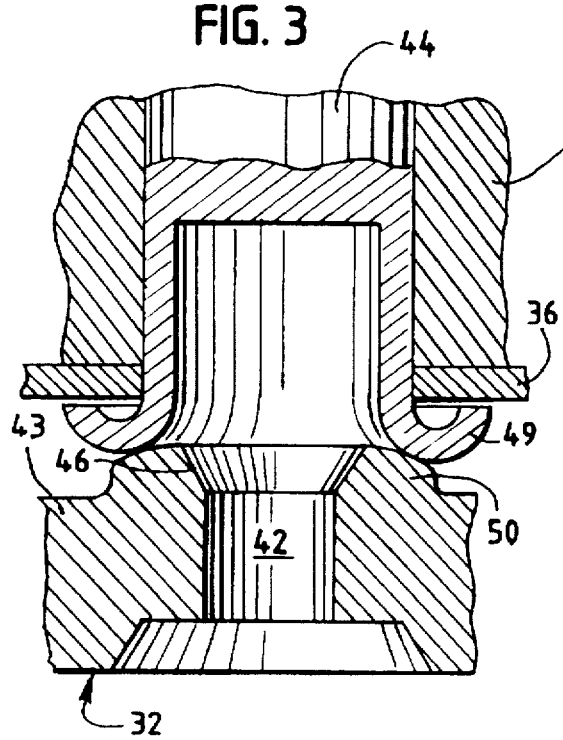
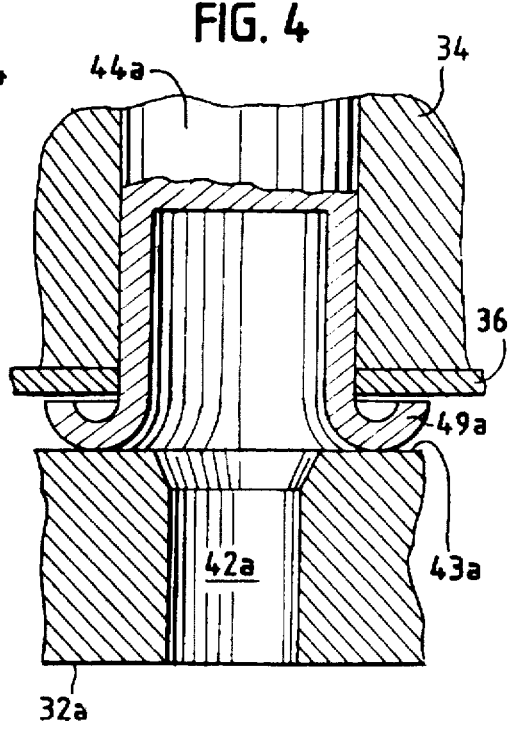

RIVETING ANVIL

BACKGROUND OF THE INVENTION

As described for example in Pray U.S. Pat. No. 3,913,180 and Richardson et al. U.S. Pat. No. 5,487,217, systems are known for installing rivets in belt fasteners and the like in which the rivet is carried on a guiding nail, which assists the rivet to pass through a fabric belt and the fastener which is to be attached to the belt, with the nail passing into an aperture of an anvil underneath the objects to be fastened together. Commercial products utilizing this type of system are also known, being similar to the designs described in the above patents.

As is known, the rivet is a rod-like structure having a bore extending along part of the length thereof, and carried on the nail with an end of the nail projecting into the rivet bore. The nail also carries a flange having an annular, concave curve facing the bore end of the rivet. Thus, when the rivet passes through the structures to be connected, and the nail passes into the anvil, the outer end of the rivet can be forcefully struck with a hammer member of any desired type, causing the tubular end portion of the rivet which surrounds its bore to flare outwardly to form a rivet end flange, thus permanently retaining the rivet in locking position which respect to the materials being rivetted. At the same time, the nail is broken free.

In the system of the Pray Pat. No. 3,913,180 and its commercial analogues, the anvil plate which holds the nail and rivet defines a depression (as shown in FIG. 9 of Pray), surrounding the aperture in which the nail resides. This depression serves as a guide path for the progress of the outwardly flaring flange which is formed by hammering the outer end of the rivet. The flange migrates outwardly until it enters into engagement with an annular, upstanding wall that surrounds the aperture of the Pray U.S. Pat. No. 3,913,180 anvil, and serves to limit the outward progress of the rivet flange as it is formed by hammering.

As a disadvantage of this structure, it is common for the rivet selected for use to be too long for the particular materials to be riveted together, such as a belt and a fastener. A reason for this is that belts for industrial use may be of highly variable thickness, particularly if a used, worn belt is being repaired, making use of a hinge fastener or the like. Since rivets come in discrete sizes, and one cannot effectively use a rivet that is too short, one may be forced to use a rivet that is too long.

In this circumstance, the anvil structures of Pray U.S. Pat. No. 3,913,180 and their commercial counterparts shape the rivet flange being formed in a depression. Thus, when the outwardly expanding flange reaches the outer edge of the depression, it is deterred from further outward advancement. At the same time, the forming flange cannot move rearwardly along the axis of the aperture and rivet very far because of the presence of the materials being riveted together, specifically the belt fastener wall. As a result of this, expansion and flow of the forming, new rivet flange is inhibited, and a weakening collapse in a more central area of the rivet, spaced from its ends, can take place in response to the forceful hammering. This can weaken the strength of the rivet, and a greater amount of force is required in this circumstance to seat the rivet in a manner which appears proper from the outside. The damage may not show.

By this invention, rivets may be emplaced, and an end flange formed, by hammering the rivet against an anvil in which the rivet flange being formed may expand radially outwardly for essentially an unlimited distance. It has been found by this invention that an outer shaping wall as used in the prior art is unnecessary for the formation of strong rivet flanges. At the same time, by this invention, the average force needed to set the rivet in proper manner is less than in the prior art, all other things being equal, particularly when the rivet is a little too long for the particular riveting job.

DESCRIPTION OF THE INVENTION

In accordance with this invention an anvil is provided for use in riveting one element to another element, such as the riveting of belting to clasps or fasteners, hinged or otherwise, for building or rebuilding belting systems and the like. The anvil defines an aperture for receiving conventional nails which carry detachable rivets, as used in the prior art processes. Thus, a rivet carried on the nail has an end that faces the anvil when the nail occupies the aperture.

The anvil defines an outer face surrounding the aperture for engaging and shaping the rivet end. By this invention, the outer face is free of adjacent, upstanding walls which are outside of and facing the aperture, above and beyond a conventional aperture countersink. Thus, upon hammering of the rivet to form a flared rivet end to emplace the rivet, the rivet end may spread freely outwardly from the aperture as the anvil shapes the rivet end.

In one embodiment, a first portion of the anvil outer face surrounding the aperture defines an elevated area when compared with other portions of the anvil outer face surrounding the elevated area. This first, elevated area portion may preferably be from about 0.03 to 0.07 inch elevated over surrounding other anvil face portions, when conventionally-sized belting rivets are used for retaining fasteners to belting or for any other desired purpose. Also, the first portion of the outer face may preferably define an annular, outer, convex slope portion to help avoid restraint of the outwardly flowing rivet flange as it forms.

In another embodiment, the anvil outer face surrounding the aperture, or each aperture present, is flat. Surprisingly, a good rivet flange can still be formed with the rivet being thus positioned along the main part of the anvil face. The initial, outward, radial curving of the flange, which is typically started by the conventional shape of the rivet nail, tends to continue without any assistance. What is important is to avoid inhibition of the formation of the flange, which inhibition is avoided by the elimination of any facing wall closely spaced around the rivet and nail, to thus interfere with the radially outward movement of the flange as it forms.

Preferably, the anvil face defines a plurality of apertures for receiving rivet-carrying nails.

The elevated area around the aperture serves to seat the rivet higher in the belt fastener than a flat surface, for example when the fastener aperture has a countersink. If no countersink is present, then the flat anvil configuration may be preferred.

Thus, by this invention a better, stronger riveting connection can be provided even when the rivet is slightly too long for its purpose, and this can be accomplished with the need for less hammering force than would be required for equivalent situations in the prior art.

DESCRIPTION OF THE DRAWINGS

In the drawings, FIG. 1 is an enlarged longitudinal, fragmentary sectional view of a rivet applying system and anvil of the prior art;

FIG. 2 is a similar sectional view of the anvil of this invention while carrying a belt and fastener system to be riveted, and with a hammer driving the rivet;

3

FIG. 3 is a greatly enlarged, longitudinal sectional view of the anvil and rivet of this invention; and FIG. 4 is a greatly enlarged, longitudinal sectional view of a portion of a modified anvil and rivet in accordance with this invention.

DESCRIPTION OF SPECIFIC EMBODIMENTS

Referring to FIG. 1, an anvil and rivet system as described in Pray U.S. Pat. No. 3,913,180 is shown. Anvil 10 comprises an apertured plate, the apertures 11 of which receive a nail 12 which carries a rivet 14 at one end. Each of the apertures of anvil 10 is surrounded by an upper, wider recess 16 limited radially by a generally circular outer wall 18.

Rivet 14 defines a bore 20 extending partially therethrough, defining a tubular end of the rivet which attaches to an end 22 of nail 12, and which defines a concave flange surface 23.

Rivet 14 is shown to be extending through a fabric belt 24 and two sides of a clasp 26, which brackets the belt and serves to connect the belt to another member such as another clasp which, in turn, is also attached to a portion of the belt.

In the prior art, one forcefully strikes the top 28 of the rivet, driving it into recess 16. The lower, tubular end of rivet 30 spreads outwardly to form an outwardly flaring flange, as defined by the concave flange 23 of the rivet. Then, as limited by the circular wall 18 of recess 16, a flared second rivet end is formed, holding the clasp 26 and the belt 24 together. In the prior art as previously described, disadvantages can occur because of difficulties in obtaining a rivet of precisely the best length.

In accordance with this invention as shown in FIGS. 2–4, an anvil 32 is provided for use in riveting one element to another element, particularly the riveting of belting 34 to both sides of a clasp or fastener 36 which brackets the belt 34 and may be hinged if desired, for connection of the belt to another element, particularly another section thereof.

Anvil 32 has a first portion 50 of the outer face surrounding the aperture which defines an elevated area when compared with other portions 43 of the anvil outer face, with first portion 50 defining an annular, outer convex slope portion as shown against which the rivet flange abuts as it is being formed.

One rivet 38, attached to its positioning nail 40, extends through the belt 34 and clasp portions 36, while being carried on nail 40 in the manner of the prior art and extending through an aperture 42 of anvil 32. It can be seen that, surrounding aperture 42 on the outer face 44 of anvil 32, is an elevated structure that is free of adjacent, upstanding walls which are outside of and facing the aperture 42, above and beyond a conventional aperture countersink 46 (FIG. 3).

Rivet 38 is shown in its initial position before driving, with nail 40 positioning the rivet in aperture 42. The rivet and nail system used may be identical to that of the prior art, including the annular, concave end portion 22a of the nail, to which the rivet is attached.

Then, rivet 44 of FIG. 2 is shown being hit by a hammer member 46 to drive it forward. The tubular end 48 of rivet 44 is initially spread by the annular, concave end of end 22a of the nail, breaking away from its connection with the rivet in the process. The rivet folds outwardly to form a generally circular flange 49 having a curved wall. The process continues by the engagement of end and flange 49 against the hump 50 defined on the facing surface 43 of anvil 32, so that rivet flange 49 is formed to prevent withdrawal of rivet 44

4 through the aperture walls of clasp 36 and belt 34. At the same time, the head 54 at the other end of rivet 44 can be formed in an enlarged manner for retention from that end. Thus, a strong rivet is formed by hammering action. The nail 40a is removed or falls away, and the riveted parts 34, 36 are separated from the anvil.

By way of advantage of this invention, it can be seen from FIGS. 2 and 3 that there is no outer wall similar to wall 18 of the prior art which limits the radially outward extension of flange 48. Thus, rivet 44 can be advanced by hammering to virtually any reasonable extent that is necessary for the end 54 of rivet to be properly seated. Thus, a rivet that is too long will still be properly seated, but will just show a wider flange 48 than a rivet that is of proper length. To the contrary, in the prior art the presence of wall 18 restricts the outward expansion of the rivet flange that is being formed by hammering, so that, upon sufficiently hard hammering, a central, tubular portion of the rivet may collapse, which weakens the rivet and is generally undesirable, with the further disadvantage that the improper riveting configuration cannot generally be seen from the outside. Thus, by this invention a stronger rivet can be emplaced with less hammering force in that frequent circumstance where the rivet used is slightly longer than optimum.

Turning to FIG. 4, another embodiment of the invention is shown. Rivet 44a may be identical in design to rivets 44 and 14, with the nail being not shown. Belt 34 and one of the walls of clasp 36, through which rivet 44a passes, are shown. Anvil 32a defines an aperture 42a as in the previous embodiment. However, in this embodiment, no hump or annular, outer convex slope portion is present, but rather the outer anvil surface 43a surrounding the aperture 42a is flat. A similar, effective end flange 49a can be formed in rivet 44a by the hammering process. Here also, there is no outer wall to restrict the outer expansion of flange 49a, which permits the use of rivets that are slightly longer than optimum without internal weakening of the rivet as it is emplaced.

The above has been offered for illustrative purposes only, and is not intended to limit the scope of the invention of this application, which is as defined in the claims below.

That which is claimed:

1. An anvil for use in riveting one element to another element, said anvil defining an aperture receiving a nail carrying a partially tubular rivet, said rivet having a tubular end that faces said anvil, said anvil defining an outer face surrounding said aperture for engaging and shaping said tubular rivet end, said outer face being free of adjacent, upstanding walls outside of and facing said aperture, whereby said tubular rivet end may curve and spread freely outwardly from said aperture to form an outwardly flaring flange as the anvil shapes the rivet end.

2. The anvil of claim 1 in which a first portion of said outer face surrounding said aperture defines an elevated area when compared with other portions of said anvil outer face.

3. The anvil of claim 2 in which said elevated area is from about 0.03 to 0.07 inch elevated over said other portions.

4. The anvil of claim 2 in which said first portion of the outer face defines an annular, outer, convex slope portion.

5. The anvil of claim 1 in which said outer face surrounding said aperture is flat.

6. The anvil of claim 1 in which said outer face surrounds a plurality of said apertures.

7. The anvil of claim 1, in combination with a hammer member for driving said end of a rivet carried by said nail in the aperture against said outer face.

8. The anvil of claim 1 in which a nail occupies said aperture, a length of belting and a fastener overlying said aperture, and a rivet, carried by said nail and extending through said belting and fastener.

9. An anvil for use in riveting one element to another element, said anvil defining an aperture receiving a detachable nail carrying a partially tubular rivet whereby said rivet carried on the nail has a tubular end that faces said anvil, said anvil defining an outer face surrounding said aperture for engaging and shaping said rivet end, said outer face being free of adjacent, upstanding walls outside of and facing said aperture beyond the maximum diameter of said rivet, whereby said tubular rivet end may curve and spread freely outwardly from said aperture to form an outwardly flaring flange as the anvil shapes the rivet end, in which a first portion of said outer face surrounding said aperture defines an elevated area when compared with other portions of said anvil outer face.

10. The anvil of claim 9 in which said elevated area is from about 0.03 to 0.07 inch elevated over said other portions.

11. The anvil of claim 10 in which said first portion of the outer face defines an annular, outer, convex slope portion.

12. The anvil of claim 11 in which said outer face surrounds a plurality of said apertures.

13. The anvil of claim 12 in combination with a hammer member for driving said end of a rivet carried by said nail in the aperture against said over face.

14. The anvil of claim 13 in which a rivet-carrying nail occupies said aperture, a length of belting and a fastener overlying said aperture, and a rivet, carried by said nail and extending through said belting and fastener.

15. An anvil for use in riveting one element to another element, said anvil defining an aperture receiving a detachable nail carrying a partially tubular rivet, whereby said rivet carried on the nail has a tubular end that faces said anvil, said anvil defining an outer face surrounding said aperture for engaging and shaping said rivet end, said outer face being free, beyond the maximum diameter of the rivet used, of adjacent, upstanding Walls outside of and facing said aperture, said outer face surrounding said aperture being flat.

16. The anvil of claim 15 in which said outer face surrounds a plurality of said apertures.

17. The anvil of claim 16, in combination with a hammer member for driving said end of a rivet carried by said nail in the aperture against said outer face.

18. The anvil of claim 17 in which a rivet-carrying nail occupies said aperture, a length of belting and a fastener overlying said aperture, and a rivet, carried by said nail and extending through said belting and fastener.

* * * * *